United States Patent Office
3,681,255
Patented Aug. 1, 1972

3,681,255
PROCESS FOR THE PREPARATION OF LIQUID CALIBRATION FLUIDS
John F. Wilfore, Schenectady, N.Y., assignor to General Electric Company
No Drawing. Filed Sept. 3, 1970, Ser. No. 69,435
Int. Cl. B01k 3/00
U.S. Cl. 252—408    9 Claims

ABSTRACT OF THE DISCLOSURE

Aqueous bicarbonate solutions when equilibrated with given concentrations of carbon dioxide-containing gases will exhibit a predeterminable pH behavior. By preselection of bicarbonate concentration and equilibration gas compositions, liquid calibration fluids suitable to standardize instruments, e.g., blood measuring devices, may be prepared having given pH concentrations and partial pressures of carbon dioxide and other gases, e.g., oxygen.

BACKGROUND OF THE INVENTION

The present invention relates to the preparation of fluids to calibrate testing instruments. More particularly, it is concerned with providing liquid buffer solutions with predetermined dissolved gas contents for calibrating pH and gas analyzers and the like.

A number of instruments have been developed commercially to directly measure the hydrogen ion content (pH), partial pressure of carbon dioxide ($P_{CO_2}$) and the partial pressure of oxygen ($P_{O_2}$) of in vitro macro and micro samples of blood, respiratory gases and other physiological fluids. Such measurements provide valuable information to physicians in the diagnosis and treatment of cardio-pulmonary diseases and aid in surgery, pulmonary function studies, cardiac catheterization, anesthesia studies, and the like.

Most commercial instruments determine the pH, $P_{CO_2}$ and $P_{O_2}$ via various electrochemical sensing mechanisms. For example, it is customary to determine pH and $P_{CO_2}$ with a glass electrode assembly and $P_{O_2}$ with an amperometrically functional electrode, e.g., one based on a platinum cathode and a silver-silver chloride anode. As with all such systems, to operate efficiently and reproducibly, frequent calibration is necessary. In most cases, calibration involves using various mixtures of liquid buffer fluids as well as separate compressed calibration gases which are housed in rather bulky, hard-to-handle, and potentially dangerous compressed gas tanks. The use of such tanks is not very attractive—usually the instrument must be mounted on a carrying cart together with the tanks—and this makes the actual analyzer quite restricted and somewhat too immobile for use outside the laboratory, e.g., in the ward or operating room of a hospital.

It would be advantageous to provide a means to calibrate such analyzers which does not require cylinders of analyzed gases, and such is a principal object of this invention.

It is a further object of this invention to provide liquid calibration fluids which contain predetermined pH, $P_{CO_2}$ and $P_{O_2}$ concentrations for use in the calibration of analysis systems, particularly blood gas analysis electrodes, and associated and related blood gas equipment.

Still another object of this invention is to provide liquid calibration fluids which, when adequately packaged, will replace the presently used bulky and dangerous compressed gas tanks and separate buffer solutions.

Yet another object of this invention is to improve the efficiency of blood gas analyzers by rendering them self-contained, portable, easily maintained, less of a safety concern and calibratible quickly and easily.

DESCRIPTION OF THE INVENTION

The above-enumerated advantages are secured according to the present invention by the unexpected finding that aqueous bicarbonate solutions when equilibrated with given concentrations of carbon dioxide gases will exhibit a predeterminable pH behavior. By selection of bicarbonate concentration and suitable calibration gases, liquid calibration fluids can be prepared having given pH concentrations and partial pressures of carbon dioxide and, optionally, of oxygen or other gases.

The process contemplated by this invention is for the preparation of a calibration fluid having a predetermined pH and a content of dissolved gases exhibiting a predetermined partial pressure over the fluid which comprises:

(a) providing an aqueous medium;
(b) adding a water soluble bicarbonate salt thereto to form a buffer solution;
(c) equilibrating the buffered solution with a carbon dioxide-containing gas to form said calibration fluid; and
(d) maintaining the calibration fluid in a closed system preventing the diffusion of gas or vapor therefrom prior to use.

It has been experimentally determined that the pH of the calibration fluid prepared according to such a process depends on the amount of bicarbonate added in step (b), the carbon dioxide content of the gas used in step (c), the barometric pressure of the surroundings, and the vapor pressure of water over the calibration fluid at the temperature of measurement. The experimentally determined values satisfy, approximately, the following equation:

$$pH = pK + \log \frac{[HCO_3^-]}{0.0003 \times (P_b - P_{wv}) \times \text{percent } CO_2}$$

wherein $P_g$ is the partial pressure of the gas, $g$, present ionization constant for carbonic acid; $[HCO_3^-]$ is the bicarbonate concentration in milliequivalents per liter (meq./l.); $P_b$ is the ambient barometric pressure and $P_{wv}$ is the equilibrium vapor pressure of water at the temperature of the measurement. pK is known and is dependent only on temperature, e.g., at 25° C., $pK_1$ is 6.37; at 37° C., it is 6.10.

It has also been experimentally determined that the partial pressure of each of the gases over the fluid depends on the content of such gas in the carbon dioxide-containing gas used in step (c), the barometric pressure of the surroundings and the vapor pressure of water over the calibration fluid at the temperature of measurement. The experimentally determined values satisfy, approximately, the following equation $$P_g = (P_b - P_{wv}) \times \frac{\text{percent } g}{100}$$

wherein $P_g$ is the partial pressure of the gas, $g$, present at the measured percentage by weight in the equilibration gas and $P_b$ and $P_{wv}$ are as above defined.

When used herein and in the appended claims, the term aqueous medium contemplates water, optionally containing dissolved salts, e.g., common salt, NaCl, in any amount necessary to obtain osmotic pressures corresponding generally to those of the fluids to be analyzed. For example, if blood is to be analyzed, it would be preferred to employ as the salt solution, isotonic normal saline having about the same osmotic pressure as blood serum. Such a solution usually comprises 0.85% by weight of common salt in water. Another suitable solution would be that known as saline solution. This is a 0.6% solution of sodium chloride, used as a physiological salt solution in dealing with body fluids other than blood. Of course, other salts can be used in place of sodium chloride to provide an aqueous salt solution, e.g., potassium chloride, ammonium chloride, lithium bromide and the like, but they are generally not as convenient or economical.

In general, any water soluble bicarbonate salt can be used to form the buffered solution of step (b); the choice being primarily a matter of economics. For example, alkali metal and alkaline earth metal bicarbonates and bicarbonates in which the cation is derived from ammonia or amines can be used—so long as they are water soluble and behave as buffer salts. A buffer salt is generally one which when added to an aqueous solution will maintain a pH notwithstanding the absorption of carbon dioxide or the introduction of acids or bases. Illustrative of useful bicarbonate salts for this invention are lithium bicarbonate, sodium bicarbonate, potassium bicarbonate, magnesium bicarbonate, ammonium bicarbonate, dimethylammonium bicarbonate, and the like. Sodium bicarbonate is the most economical and is preferred.

The carbon dioxide-containing gas used in step (c) to equilibrate the buffer solution can be either pure carbon dioxide or a mixture of carbon dioxide with one or more inert gases. By the term "inert gas" is meant one which will not react with the buffer solution in such a fashion so as to change the pH (thus destroying the predictability of the final pH value). The term "inert gas" also excludes those which will react with any of the ingredients in the calibration fluid. Suitable "inert gases" are, for example, nitrogen, oxygen, and the other gases found normally in the air, including the noble gases, neon, argon, krypton, xenon, helium, and the like. Ordinarily preferred as equilibration gases for blood gas analyzers are mixtures of carbon dioxide and nitrogen or of carbon dioxide, oxygen and nitrogen. Illustrative gases, for example, would be, substantially, (i) 5% $CO_2$; balance $N_2$; (ii) 10% $CO_2$; balance $N_2$; (iii) 5% $CO_2$; balance $O_2$, all percentages being by weight, and the like. Such analyzed gas mixtures are available commercially. The term "equilibrating" in step (c), is used in its art-recognized sense—it means that the gas and the buffer solution are maintained in contact until such time as a state of equilibrium has been reached between the gas dissolved in the liquid phase and that which is undissolved.

After the calibration fluid has been prepared according to this invention it should be maintained prior to use in a closed system which prevents the diffusion of gas or vapor prior to use. Unless such a step is taken, the partial pressure value will drift and this will cause the pH value to change and become unreliable. This step is obviously very important, therefore, to maximize reproducibility, reliability, accuracy and shelf-life. A convenient packaging system permitting no gas or vapor diffusion and capable of liquid delivery without establishing any liquid-gas interface, is a self-collapsing bag or tube. Packaging systems based on such a concept included:

(1) A plastic bag, similar to a Fenwal blood bag, laminated with a plastic, such as polyvinylidene chloride (Saran), which has a low gas permeability. The bag can be further laminated with a 0.001 in. aluminum foil and an external protective plastic layer. With sealed edges, the package is tough, strong, self-collapsing and has a long shelf-life;

(2) A plastic bag of somewhat less complex construction is sealed in a metal can containing a gas composition identical to the concentration within the bag. Equilibrium will be maintained because the metal can allows no external diffusion to occur. The can is opened just before use;

(3) A metal can containing an inflatable insert. The can is sealed and no liquid-gas interface and no gas or vapor diffusion takes place; and (4) A plastic lined metal tube, such as a tooth-paste type tube, with a metal seal on one end and a heat-sealed pressed seal on the other end. This can be pressured externally to accomplish delivery.

Other suitable packaging systems can also be provided by those skilled in the art to contain and deliver the liquid calibration fluids disclosed herein.

DESCRIPTION OF THE PREFERRED EMBODIMENTS

The following examples describe the process of this invention. They are merely illustrative and are not to be construed as limiting the claims thereto.

Example 1

To isotonic saline is added bicarbonate in an amount to provide 1.521 g./l. (0.01811 M or 18.11 mM). The solution is equilibrated at 37° C. and 758 mm. Hg barometric pressure with a gas comprising 10.02% $CO_2$; balance $N_2$, by weight.

Taking into account the vapor pressure of water at 37° C. and the barometric pressure of the surroundings ($P_b$, 758 mm.), the partial pressure of carbon dioxide should be:

$$P_{CO_2} = (P_b - P_{wv}) \times \frac{CO_2 \text{ percent}}{100}$$
$$= (758 - 47) \times .1002$$
$$= 71.2 \text{ mm.}$$

The fluid is measured on an accurately calibrated blood gas analyzer (Radiometer PHM 72, manufactured by Radiometer A/S, Copenhagen, Denmark) and the pH experimentally determined is 7.025 and the $C_{CO_2}$ experimentally determined is 63.0 mm.

Substituting the appropriate values in the following equation:

$$p_h = 6.10 + \log \frac{[HCO_3^-]}{0.0003 \times (P_b - P_{wv}) \times \text{percent } CO_2}$$
$$= 6.10 + \log \frac{18.11}{0.0003 \times 7120} = 6.10 + \log 8.4785$$
$$= 6.10 + .929 = 7.029$$

the predetermined pH value is 7.029.

Example 2

To isotonic saline is added sodium bicarbonate in an amount to provide 1.9108 g./l. (0.02274 M or 22.74 mM). The solution is equilibrated at 37° C. and 758 mm. Hg with a gas comprising 4.80% $CO_2$; 11.62% $O_2$; balance $N_2$, by weight.

The partial pressure of carbon dioxide, $P_{CO_2}$, calculated by the procedure of Example 1 is 34.1 mm.

The partial pressure of oxygen calculated from the equation:

$$P_{O_2} = (P_b - P_{wv}) \times \frac{O_2 \text{ percent}}{100}$$

wherein $P_b$ and $P_{wv}$ are as above defined, $$= (758 - 47) \times .1162$$

is 82.6 mm.

The fluid is measured on an accurately calibrated Radiometer PHM 72 blood gas analyzer and the pH experimentally determined is 7.434 and the $P_{CO_2}$ is 34.3 mm., while the $P_{O_2}$ is 82.9 mm.

Substituting the appropriate values in the following equation:

$$pH = 6.10 + \log \frac{[HCO_3^-]}{0.0003 \times (P_b - P_{wv}) \times \text{percent } CO_2}$$

and solving as outlined in Example 1, the predetermined pH value is 7.447.

The predeterminability in pH behavior of the liquid calibration fluids prepared according to this invention is readily apparent.

The principles of this invention have been explained and have been illustrated and described in what are now considered to represent the best embodiments. However, it is to be understood that, within the scope of the ap-

I claim:

1. A process for the preparation of a calibration fluid having a predetermined pH and a content of dissolved gases exhibiting a predetermined partial pressure over said fluid which comprises:
    (a) providing an aqueous medium;
    (b) adding a water soluble bicarbonate salt thereto to form a buffered solution;
    (c) equilibrating said buffered solution with a carbon dioxide-containing gas to form said calibration fluid; and
    (d) maintaining said calibration fluid in a closed system preventing the diffusion of gas or vapor prior to use, whereby the pH of said fluid is determined by the amount of bicarbonate added in step (b), the carbon dioxide content of the gas used in step (c), the barometric pressure of the surroundings, and the vapor pressure of water over the calibration fluid at the temperature of measurement, according to the equation:

$$pH = pK + \log \frac{[HCO_3^-]}{0.0003 \times (P_b - P_{wv}) \times \text{percent } CO_2}$$

wherein $pK$ is the logarithm of the reciprocal of the ionization constant for carbonic acid; $[HCO_3^-]$ is the bicarbonate concentration in meq./l.; $P_b$ is said barometric pressure; and $P_{wv}$ is said vapor pressure of water; and wherein the partial pressure of each of said gases over said fluid is determined by the content of the said gas in the carbon dioxide-containing gas used in step (c), the barometric pressure of the surroundings and the vapor pressure of water over the calibration fluid at the temperature of measurement, according to the equation:

$$P_g = (P_b - P_{wv}) \times \frac{\text{percent } g}{100}$$

wherein $P_g$ is the partial pressure of gas, $g$, and $P_b$ and $P_{wv}$ are as above defined.

2. A process as defined in claim 1 wherein the aqueous medium is isotonic normal saline, having the same osmotic pressure as blood serum.

3. A process as defined in claim 1 wherein said water soluble bicarbonate salt is an alkali metal or an alkaline earth metal bicarbonate.

4. A process as defined in claim 1 wherein said carbon dioxide-containing gas comprises carbon dioxide and nitrogen.

5. A process as defined in claim 1 wherein said carbon dioxide-containing gas comprises carbon dioxide, oxygen and nitrogen.

6. A process for the preparation of a calibration fluid having a pH of 7.025 and a content of carbon dioxide exhibiting a $P_{CO_2}$ of 63 mm. which comprises
    (a) providing an aqueous isotonic saline solution;
    (b) adding sodium bicarbonate thereto to a concentration of 18.11 meq./l.;
    (c) equilibrating the solution of step (b) at 37° C. and a barometric pressure of 758 mm. Hg with a gas mixture comprising 10.02% carbon dioxide and balance nitrogen, by weight; and
    (d) storing the product of step (c) in a system allowing for no liquid-gas interface and no gas or vapor diffusion.

7. A process for the preparation of a calibration fluid having a pH of 7.434 and exhibiting a $P_{CO_2}$ of 34.3 mm. and a $P_{O_2}$ of 82.9 mm. which comprises
    (a) providing an aqueous isotonic saline solution;
    (b) adding sodium bicarbonate thereto to a concentration of 22.74 meq./l.;
    (c) equilibrating the solution of step (b) at 37° C. and a barometric pressure of 758 mm. Hg with a gas mixture comprising 4.80% carbon dioxide, 11.62% oxygen, balance nitrogen, by weight; and
    (d) storing the product of step (c) in a system allowing for no liquid-gas interface and no gas or vapor diffusion.

8. A process for the preparation of a calibration fluid having a predetermined pH and a content of dissolved gases exhibiting a predetermined partial pressure over said fluid which comprises:
    (a) providing an aqueous medium
    (b) adding a water soluble bicarbonate salt and a carbon dioxide containing gas thereto to form a buffered solution, said water soluble bicarbonate being added in an amount determined by the equation:

$$pH = pK + \log \frac{[HCO_3^-]}{0.0003 \times (P_b - P_{wv}) \times \text{percent } CO_2}$$

wherein pK is the logarithm of the reciprocal of the ionization constant for carbonic acid; $[HCO_3^-]$ is the bicarbonate concentration in meq./l.; $P_b$ is said barometric pressure; and $P_{wv}$ is said vapor pressure of water; and said carbon dioxide containing gas being added in an amount determined by the formula:

$$P_g = (P_b - P_{wv}) \times \frac{\text{percent } g}{100}$$

wherein $P_g$ is the partial pressure of the $CO_2$ containing gas, $g$, and $P_b$ and $P_{wv}$ are as above defined.

9. A process for the calibration of a blood gas analyzer which comprises employing as a calibration fluid a fluid which consists of an aqueous medium, a water soluble bicarbonate and a carbon dioxide containing gas.

References Cited
UNITED STATES PATENTS

| | | | |
|---|---|---|---|
| 3,380,929 | 4/1968 | Petersen | 252—408 |
| 3,147,081 | 9/1964 | Stevenson | 23—230 B |
| 2,178,550 | 11/1939 | Acree | 252—408 X |
| 3,467,582 | 9/1969 | Petersen | 23—253 X |

ROBERT F. BURNETT, Primary Examiner

M. E. McCAMISH, Assistant Examiner

U.S. Cl. X.R.

23—230 B, 253 R; 204—1, 195; 324—30

Dedication 3,681,255.—*John F. Wilfore*, Schenectady, N.Y. PROCESS FOR THE PREPARATION OF LIQUID CALIBRATION FLUIDS. Patent dated Aug. 1, 1972. Dedication filed Oct. 14, 1980, by the assignee, *General Electric Company*.

Hereby dedicates to the Public the remaining term of said patent.

[*Official Gazette March 10, 1981.*]